United States Patent [19]
Leijonberg

[11] Patent Number: 6,016,737
[45] Date of Patent: Jan. 25, 2000

[54] TRANSMISSION

[75] Inventor: Gunnar Leijonberg, Huskvarna, Sweden

[73] Assignee: Gul & Co Development AB, Huskvarna, Sweden

[21] Appl. No.: 09/160,359

[22] Filed: Sep. 25, 1998

Related U.S. Application Data

[63] Continuation of application No. PCT/SE97/00550, Mar. 26, 1997.

[30] Foreign Application Priority Data

Apr. 1, 1996 [SE] Sweden .................................. 9601282

[51] Int. Cl.[7] ...................................................... F01B 7/02
[52] U.S. Cl. ............................... 92/69 R; 92/72; 92/140; 74/25; 74/55; 123/44 R; 123/44 B; 123/44 E; 123/43 C
[58] Field of Search .................................. 92/69 R, 12.1, 92/72, 140; 74/25, 55; 123/44 R, 44 B, 44 E, 43 A, 43 AA, 43 C

[56] References Cited

U.S. PATENT DOCUMENTS

| 1,481,727 | 1/1924 | Moore | 74/55 |
|---|---|---|---|
| 1,667,213 | 4/1928 | Marchetti | 74/55 |
| 5,454,352 | 10/1995 | Ward | 123/44 B |

FOREIGN PATENT DOCUMENTS

| 25 52 081 | 6/1977 | Germany . |
| 1800103 A1 | 3/1993 | U.S.S.R. . |

*Primary Examiner*—Thomas E. Denion
*Attorney, Agent, or Firm*—Pillsbury Madison & Sutro LLP

[57] ABSTRACT

The present invention is for a means for transmission of force whereby linear movement is transferred into rotating movement or reverse. The invention is primarily intended to be used by combustion engines. The invention is for a means to transmit force between a forward and backward movement and a rotating movement by means of a ballbearing which runs in several tracks comprising a ball which is surrounded by ballholder which is fixed onto a piston rod for each respective ball or corresponding device for transmission of the linear movement. Fixed connected to each piston (4,5) is a piston rod (6,7) which in its opposite end has a holding device (17,18) for the ball (15,16) through which the force from the forward and backward movement is transmitted to the rotating disc (13). The balls (15,16) also serve as bearing between the stationary disc (8) and the rotating disc (13).

23 Claims, 15 Drawing Sheets

TRANSMISSION

This is a Continuation of International Appln. No. PCT/SE97/00550 filed Mar. 26, 1997 which designated the U.S.

BACKGROUND OF THE INVENTION

The present invention is for a means for power transmission, between a linearly moving mechanism and a rotationally moving mechanism. The invention is primarily intended to be used for combustion engines but is not limited to this field.

The transmission of power between a rectilinear movement and to a rotating movement usually takes place with the use of some kind of crankshaft or a like device. In some cases, however, crankshafts are less suitable, and this is especially the case when linear movements of different often opposite directions shall be transferred into a rotating movement. Especially this holds for the kind of power-machines, e.g. combustion engines, compressors and pumps where two pistons at the same time work against each other in a common cylinder bore. In such cases the use of crankshafts brings with it complicated mechanical designs necessary to convert the total power from the two pistons into one common rotating movement.

In a traditional crankshaft design there are forces between the piston and cylinder bore which cause so called chest drawer effects. In these designs the small end of the piston rod is positioned underneath the piston which brings with it a design which is very complicated from a manufactured point of view, and which sets special requirements for lubrication and the design of the lubricating system The other end of the piston rod is mounted in bearings on the crankshaft and frictional forces in this bearing reduce the mechanical efficiency of traditional designs. With the means of the present inventions the sideforces which cause the chest drawer effects are greatly reduced, and the need for lubrication is much reduced and the remaining need for lubrication is simplified. Further an essential reduction is achieved of the mass of piston and parts which correspond to piston rod, crankshaft and crank bearings and important simplifications are achieved by the manufacture of these parts.

The present invention is for a means to transmit power between a linear movement and a to a rotating movement by means of a ballbearing which runs in tracks. The means comprises a ball which is surrounded by a ballholder which is mounted onto a piston rod or corresponding means for each ball for transmission of the linear movement.

The balls are movable both with one (upper) part in linear tracks and with another (lower) part in a common closed curved track in a rotating disc. The combination of the linear tracks and the curved track holds the balls in position and makes it possible for them to move only in linear backwards and forward movements in the direction of linear tracks and with the inner and outer position respectively defined by the respective inner and outer distance of the curved track to the rotational centre of the rotating disc. The linear track and the curved track have a generally semicircular cross-section which closely follows the balls. Adaptation, tolerances etc. to the balls is decided in consideration of choice of material, rotational speeds, loads, lubricating means etc.

The curved track has a closed curved shape where the shape is decided by the movement of the balls relative to the turning angle of the rotating disc. The balls achieve a forward and backward linear movement if the curved track is designed with variable distance to the rotational centre of the rotating disc. If the curved track has a constant distance to the rotational centre circular shape, the balls will make no forward or backward movement. If the distance to the rotational centre is increased the balls move outwards, and if the distance to the rotational centre is decreased the movement is inwards. The number of forward and backward movements per round for the balls is thus due to the shape of the curved track. In desired segments the balls may be given a resting position if the curved track is given a circular shape. The number of forward and backward movements per rotational round for the balls is due to the number of respectively outer and inner track positions which the curved track reaches during a full round. It is not necessary that all of the outer and inner positions are varied. It may also be desired that they are non-rotational symmetric i.e. the balls do not make movements which are symmetric in respect of the rotational centre.

When turning of the rotating discs increases the distance from the curved track to the rotational centre the inside of the curved track forces the ball outwards. It is thus the one quarter sector of the great circle in the contact line between the balls and the curved track which forces the respective ball outwards. When the rotating disc turns so that the distance of the curved track to the rotational centre decreases the outer side of the curved track in the corresponding way forces the balls inwards. The balls are caused to move when the curved track thus changes its distance to the rotational centre. In these positions the curved track is at a non-right angle to the linear tracks. The components of force in the linear bearings caused by the above mentioned forces from the angled position of the curved track and transferred by the balls up to the linear bearings is split up in a force direction only along and across the linear bearings. It is the resulting force components in the length direction of the linear bearings which affects the ball and gives to them forward and backward motions.

The system for distribution of power with alternately working forces in various part sections around the ball and further distribution of the forces through the ball and out to the linear and the curved tracks respectively additionally has means for further introducing and transferring forces around the ball. From the rotational centre and out to the respective ball there is arranged a pressure round/piston round which runs inside the linear bearing up to the ball and is applied to the ball mainly in that part of the great circle sector which is turned inwards to the rotational centre and situated above the curved track. This sector of the ball can receive a force, transmit the force further through the ball to the quartersection of the great circle to that part of the curved track which is not at right angle.

The angled position causes counterforces in the linear track which are separated into force components along and across the linear track. The force component along the linear track causes a counterforce in the rotating disc having the curved track which in itself transmits a turning movement and force to the rotating disc. In a corresponding way an inwardly directing force from the curved track transmits itself through the ball, force components etc. up to a force which forces the pressure rod inwards towards the rotational centre.

In phase of operation when forces out from the ball shall be transmitted to (the pressure rod) the pull rod/the piston rod the force shall be transmitted mainly from that part of the great circle sector of the ball which is turned away from the rotational centre and situated above the curved track. From here the force shall be transmitted, pass the ball and into the connecting rod. This can be achieved in various ways by connecting above the tall or connecting at the sides of the ball which are situated in the lengthwise direction of the curved track.

The balls will rotate around their own theoretical axis of rotation, the direction of which is mainly continuously changing. The ball will have a direction of rotation which is mainly generated by friction from the curved track in its direction of rotation, but it will also be affected by friction from the linear track. If the design could be made without friction the ball should not at all have to rotate, but only make linear forward and backward movements, not rotating around its own theoretical axis of rotation. The balls will thus have both slipping and rotating functions, relative to both the rotating curved track and the linear track. However the balls will not take positions with directly reversing directions of rotation, but the ball is supposed to be continuously rotating and with a slipping function relative to adjacent pressure sector surfaces. When the ball also continuously rotates around its own axis of rotation the lubricant which is needed can also be introduced between the ball and the pressure sector surfaces in question. It is then important that the quality of the lubricant, its consistence etc. and the connecting of the pressure sector surfaces to the ball, the kind and quality of the ball are optimised and adapted to the actual application of the power machine equipment as far as loading, rotational speed, number of strokes per round, accelerating and retarding forces by reversing directions of the linear movement etc.

DESCRIPTION OF THE DRAWING

The invention will below be described more in detail with reference to the embodiment shown in the enclosed figures.

DETAILED DESCRIPTION OF THE INVENTION

Figure 1:
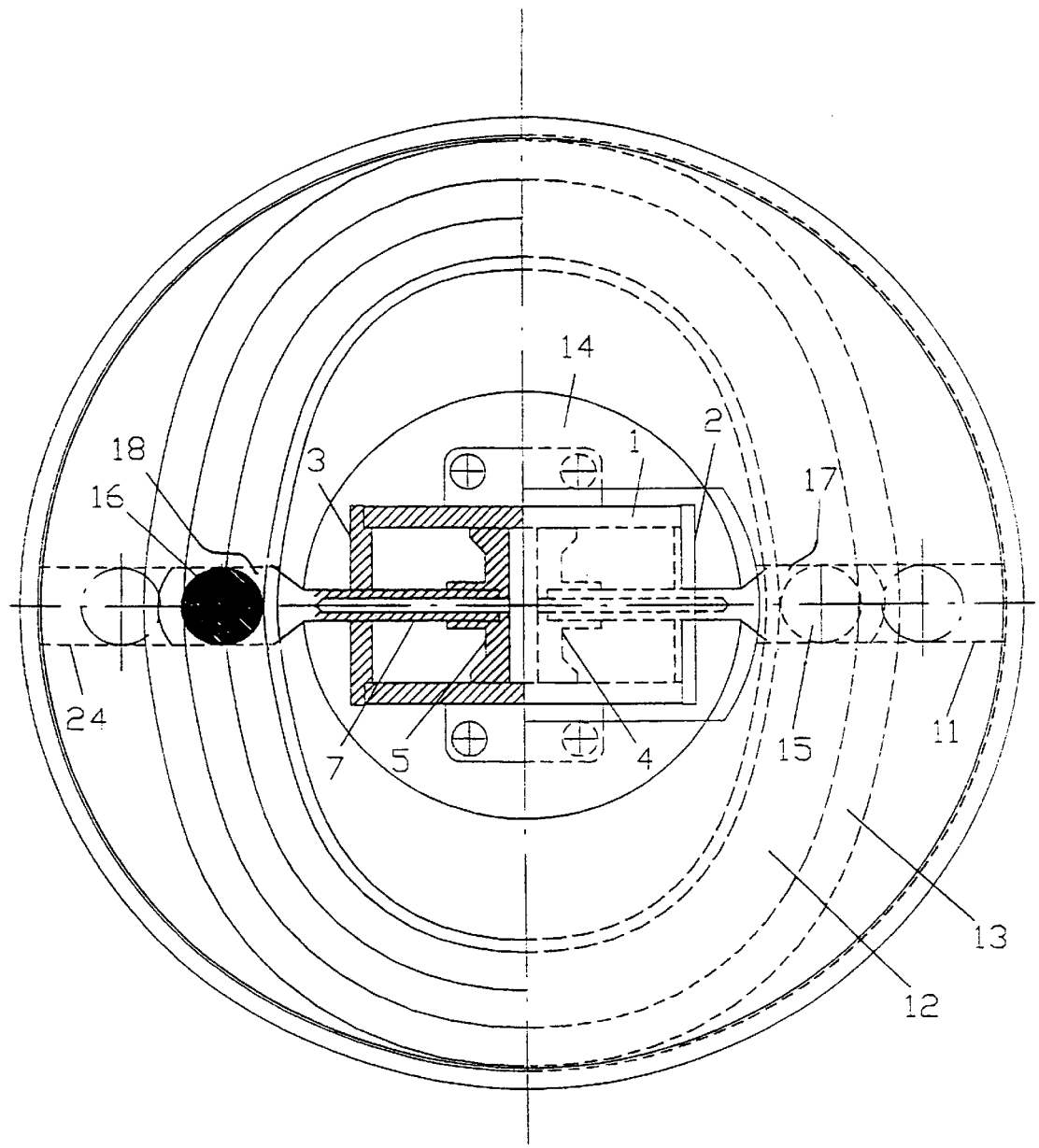
FIG. 1 is a plane view, partly in cross-section, of a device according to the invention.
Figure 2:
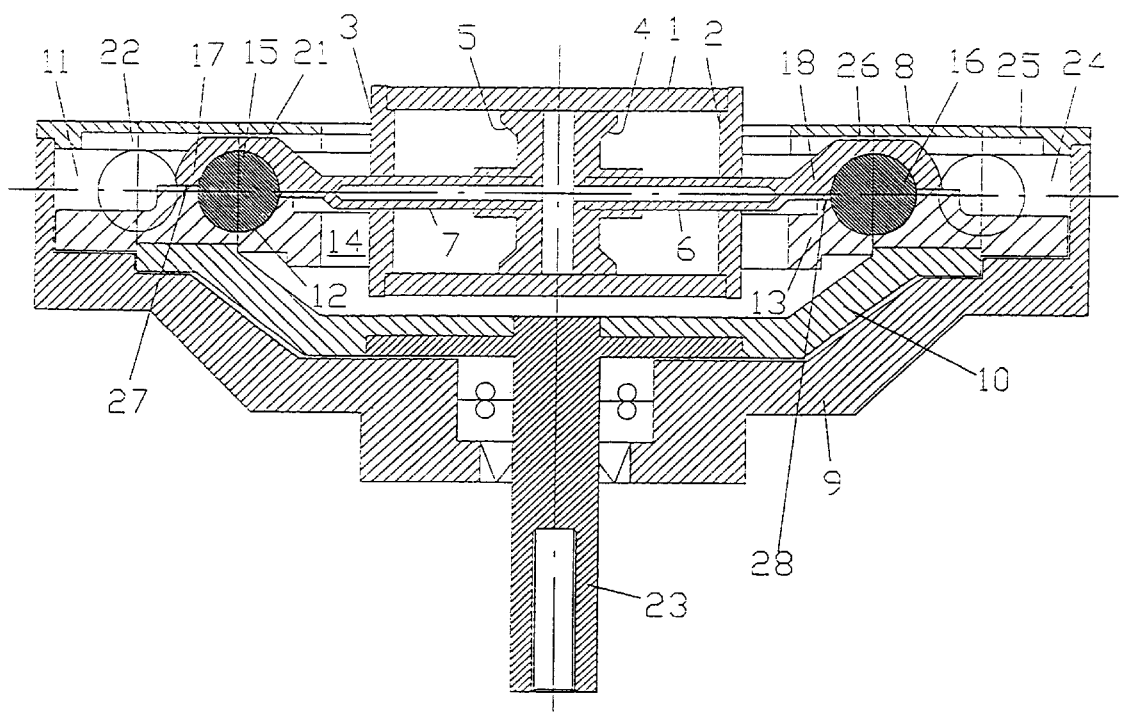
FIG. 2 is a cross-section of the device of FIG. 1, at right angle thereto.
Figure 3:
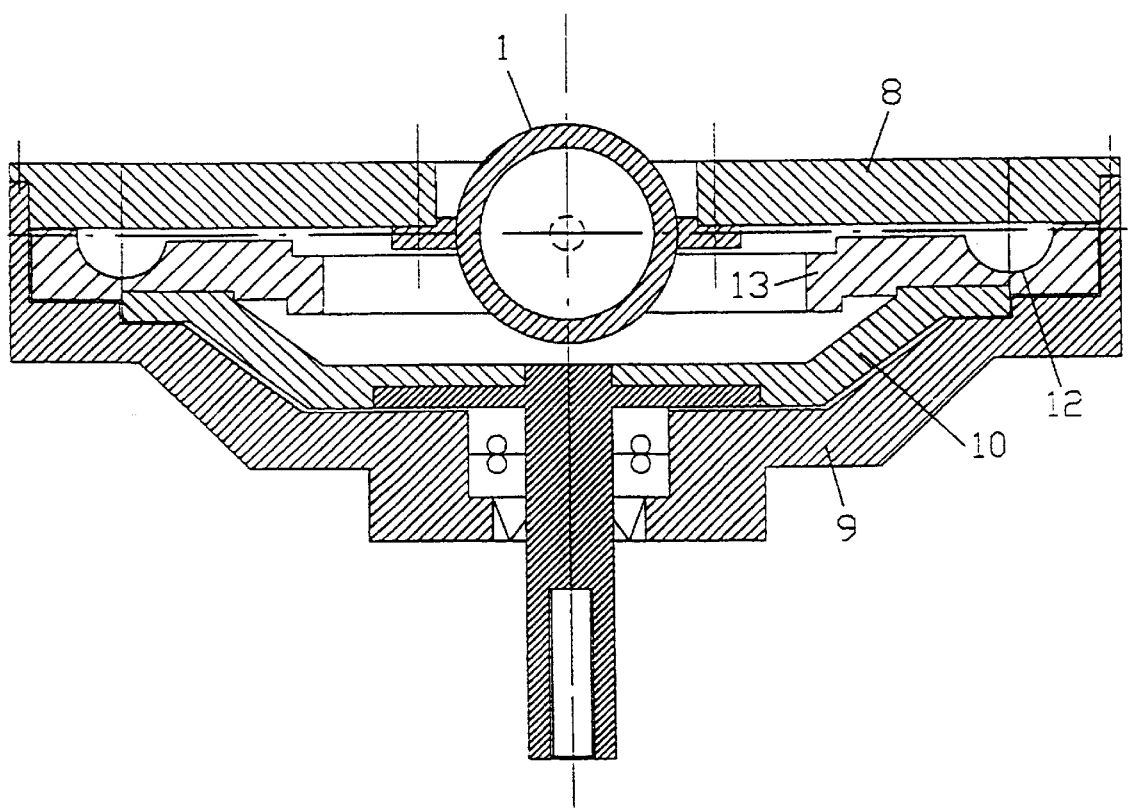
FIG. 3 is a cross-section of the device of FIG. 1, at right angle also to FIG. 2.

The device shown in the figures has two parallel flat discs, one which is named stationary disc 8 and one relatively thereto rotating disc 13. The stationary disc 8 is carried by a housing 9 and the disk 8 in turn carries in the centre thereof a cylinder 1 having short end walls 2, 3. In the cylinder there are two pistons, 4, 5 which are working pistons in a combustion engine having a common combustion chamber. In other applications they may be the pistons of a pumping device. Valves, fuel injections systems etc. which belong to the engine are not part of the invention and are not shown in the figures. Fixedly joined to each piston 4, 5 is a piston rod 6, 7 which in turn at its other end has a holding device 17, 18 for the ball 15, 16 through which the force from the forward and backward movement is transferred to the rotating disc 13. The balls 15, 16 also serve as bearing between the stationary disc 8 and the rotating disc 13. The rotating disc 13 is mounted to a holder 10 which in turn is mounted onto an outgoing shaft 23, from which the rotating force is taken to be used for various working purposes. In a preferred embodiment of the invention the centre axis of the cylinder ball coincides with the centre axis of the line of movement of the balls.

If the invention is applied to a pump or compressor the above and the following also applies with modifications which are caused by the application and the transmissional force is from the rotating disc.

The balls 15 and 16 are movable, both in linear tracks 11,24 in the fixed disc, and in a common oval shaped track 12 in the rotating disc. The extension of the linear tracks have been marked with broken lines in FIG. 1. In the bottom of the linear tracks which have a circular surface there are guide tracks 22, 25. The ballholders 17, 18 have protrusions 21, 26 which correspond to the guide tracks and being guide rails.

The ballholders 17, 18 are specially designed so that the transmissional force shall take place with as small losses as possible, and with the avoiding of an angular load. The design in this case has primarily aimed at the phase of operation when the pistons during combustion of fuel are forced away from each other and hereby exercise a force on to the piston rods which through ballholders and balls is transmitted to the rotating disc. In the other phases of operation the forces in the direction of the piston rods are smaller. The tracks, balls and ballholders of the device are so shaped and dimensioned that the contact between the different parts is not only at the points, but along linear contact surfaces. In order to achieve the best efficiency and avoid angular loads in the tracks wherein the balls are moving, the connecting surfaces should be parts of the great circles on the balls and be positioned in the same plane or in planes at right angle to each other for forces and counterforces. This can be achieved by special designs of tracks and ballholders with adaptation to the application in question.

The division into sectors around the ball can be made in different ways at different heights depending upon which forces or components of forces that shall be given priority. The curved track may have different heights on its outer and inner side respectively and the surface of the pressure and pull sectors away from the piston rod side can in the corresponding way be made higher or lower.

The enclosing sides of the linear bearing may extend down to the closest possible distance from the inner and outer sides respectively of the curved track. In the case of a lowered upper edge of the inner side of the curved track and a raised outer side the sides/edges of the linear track may be extended down to closely adjacent to the lower part of the inner side of the curved track in the part of the linear track which includes the movement of the ball from its innermost position and out corresponding the length of the radius of the ball, when the ball in its inner position contacts the linear bearing in line with the centre of the curved track. From this point there is a distance of one ballradius to the innermost outer edge of the curved track. The corresponding holds if the inner edge is made higher than the outer edge.

Figure 9:
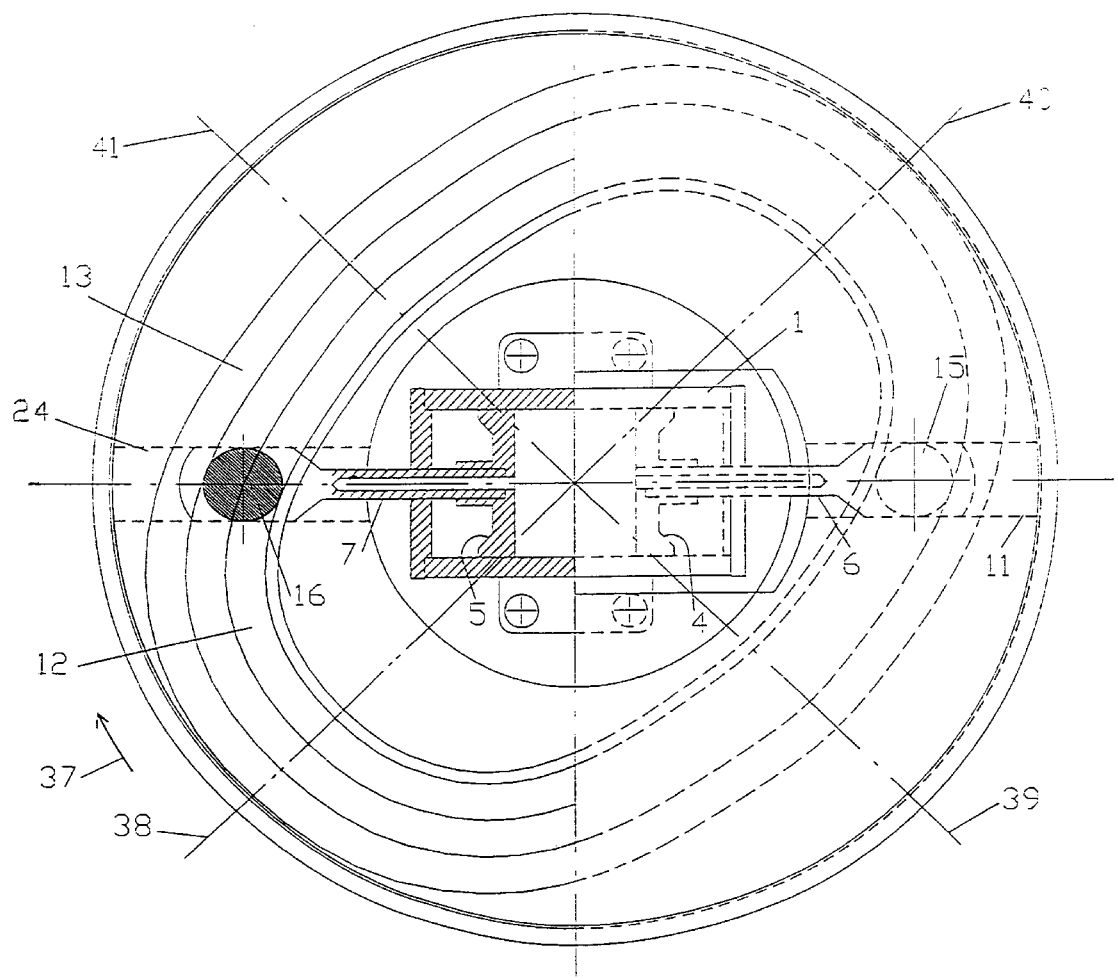
FIG. 9 shows the device of FIG. 1 at another stage of operation.

The function of the device will now be described more in detail and is illustrated by the situation shown in FIG. 9 wherein the rotating disc has turned 45° from the position as shown in the corresponding FIG. 1. The powermachine shown in FIG. 9 is supposed to be a combustion engine in the phase of operation where the fuelmixture in the combustion chamber between the pistons has been ignited and is expanding. The pressure from the pistons is transformed into a force onto the balls 15, 16 which in turn transmit the forces to the curved track 12 and the linear tracks 11, 24. In the position shown in the figure this causes a force on the ball 15, 16 directed at angle upwards from the rotating track 12 and a force directed at an angle downwards from the linear track 11, 24 with a resulting force which influences the rotating disc so that it moves in the direction shown by the arrow 37. When the rotation continues the ball 16 passes the lower dead centre (LDC) 38 and if the engine is working by the four-stroke principle combustion gases are blown out during rotation to the upper dead centre (UDC) 39 During continued movement to the next LDC there is intake of fuel and air whereupon the gas mixture is compressed up to the next UDC 41. A full cycle of operation if thus passed through during only one round of rotation of the rotating disc. If the engine works by a two-stroke principle in a corresponding way two full cycles of operations are passed while the disc rotates one round. Corresponding working conditions apply when the device works as a pump or compressor, but the forces between the balls and the upper and lower track respectively may then have reverse directions. By chancing the shape of the rotating track 12 e.g. to that of a four-leaf clover one achieves twice the number of working cycles for each round that the disc rotates. Further various designs of the track 12 may cause other conditions for the number of working cycles per rotational round.

The ballholder will now be described more in detail with reference to the embodiment shown in FIG. 4. A front edge 19 and a rear edge 29 are connected with each other and surround the ball 15 around parts of its periphery. The ball is so mounted that its centre point coincides with the centre axis of the piston rod 6 the plane of the edge 19 is somewhat below a parallel plane through the centre axis of the piston rod and the rear part 29 in a corresponding way is somewhat above a plane parallel therewith through the centre axis of the piston rod. The lower part of the ball as shown in FIG. 4 runs in the track 12 in the rotating disc In the operation phase the pressure force may in this way be transmitted from the piston to the rotating oval track 12 almost in a linear way and using linearly extending contact surfaces of the ball so that pointwise contact surfaces are avoided.

Figure 10:
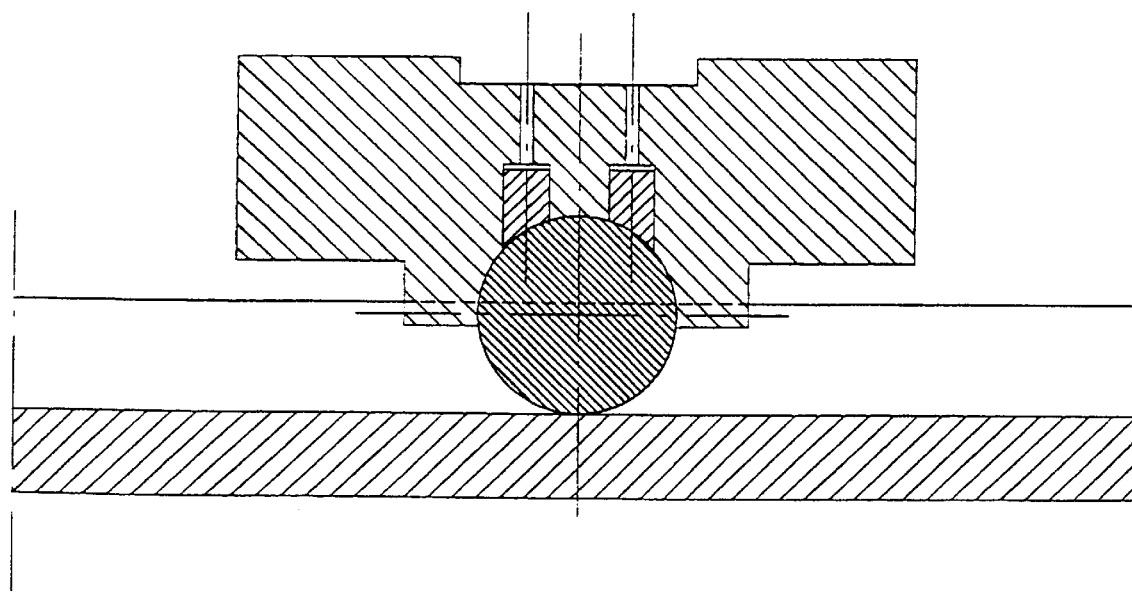
FIGS. 10–13 show another embodiment of parts of the device, whereby the tracks and the limiting surfaces of the ballholders have been optimised for a certain application.
Figure 11:
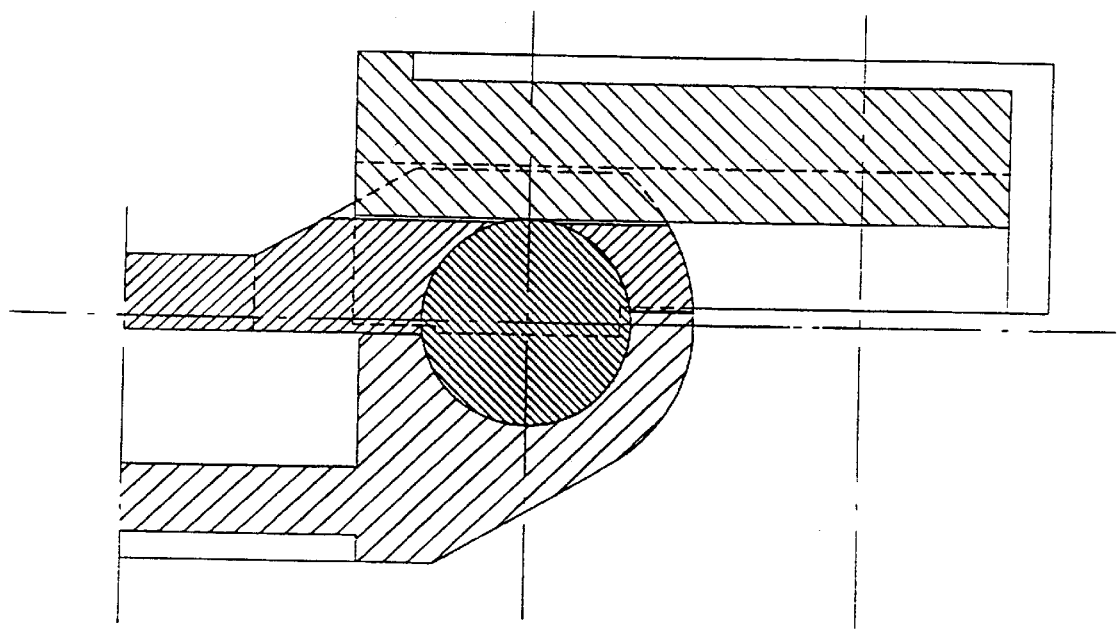
Figure 12:
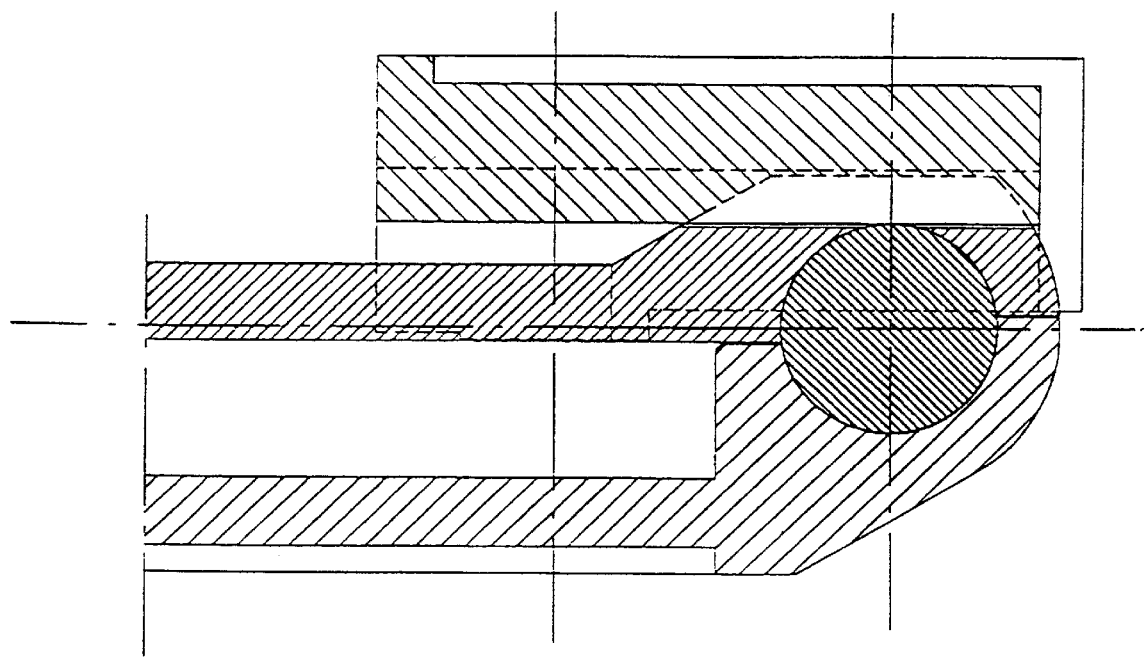
Figure 13:
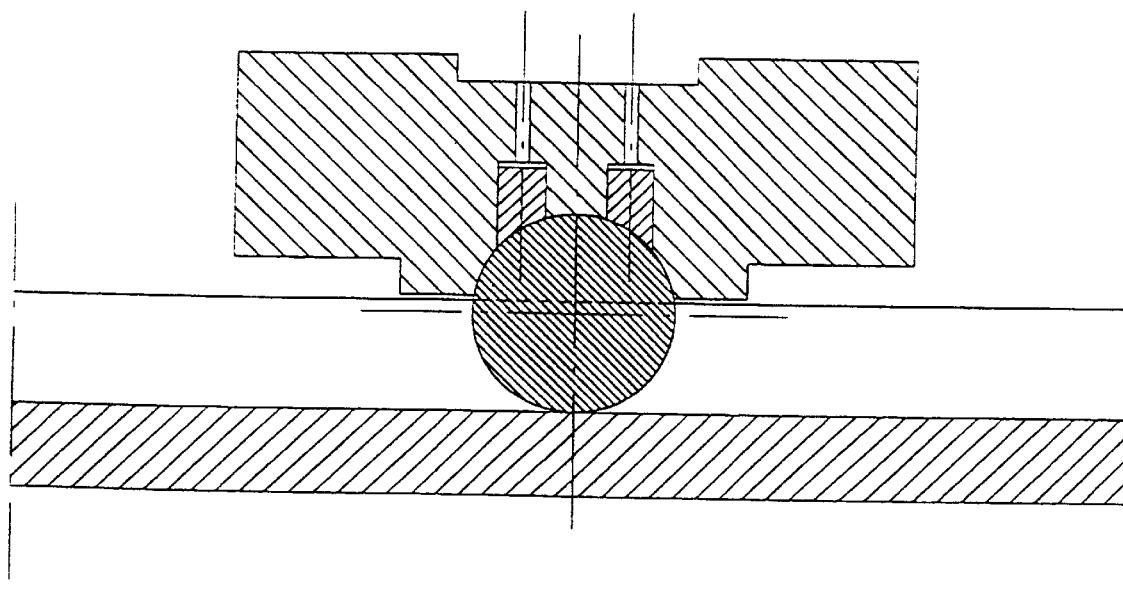
Figure 14:
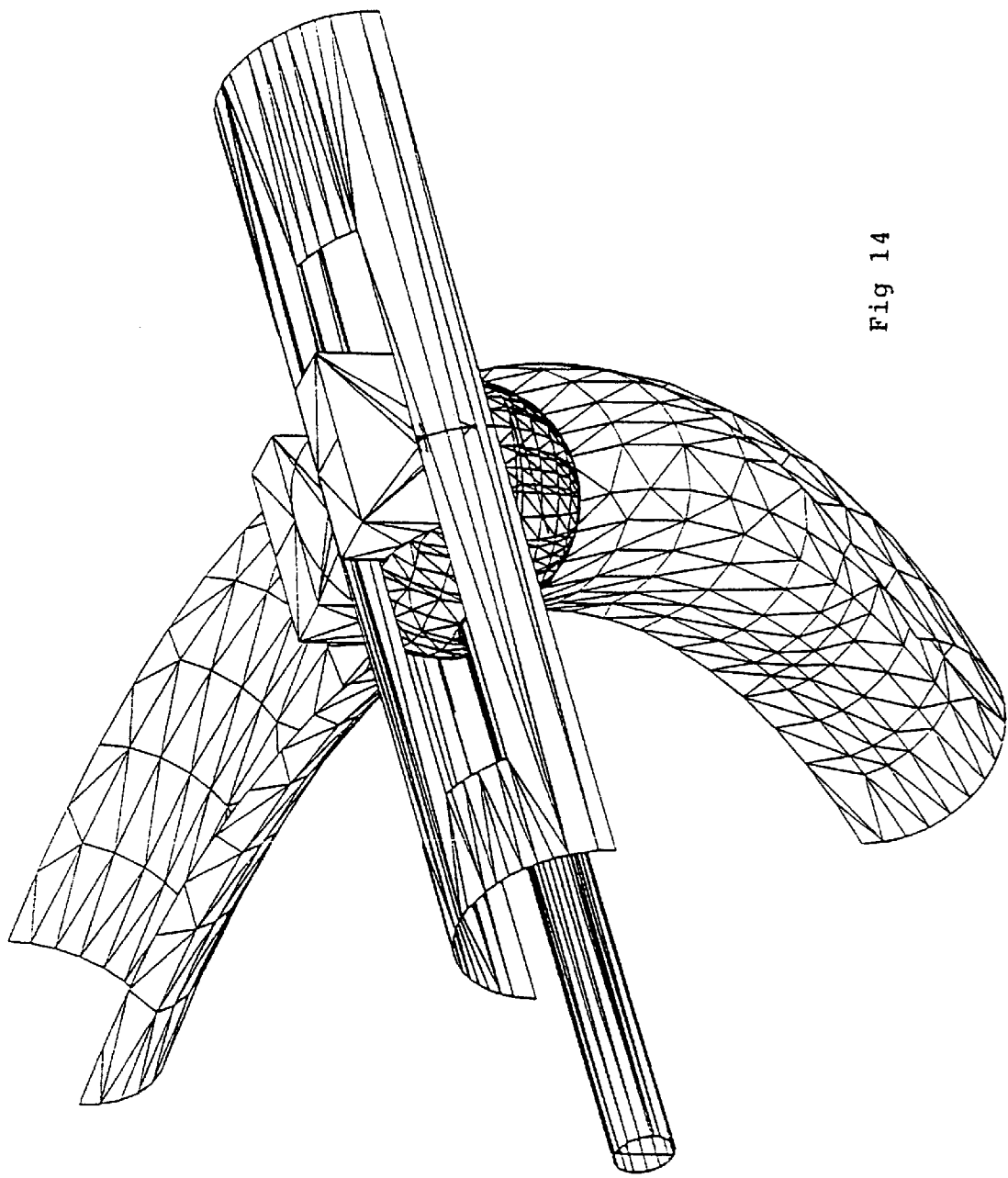
FIGS. 14–15 is a perspective view of the device in a working position and with the parts separated from each other.
Figure 15:
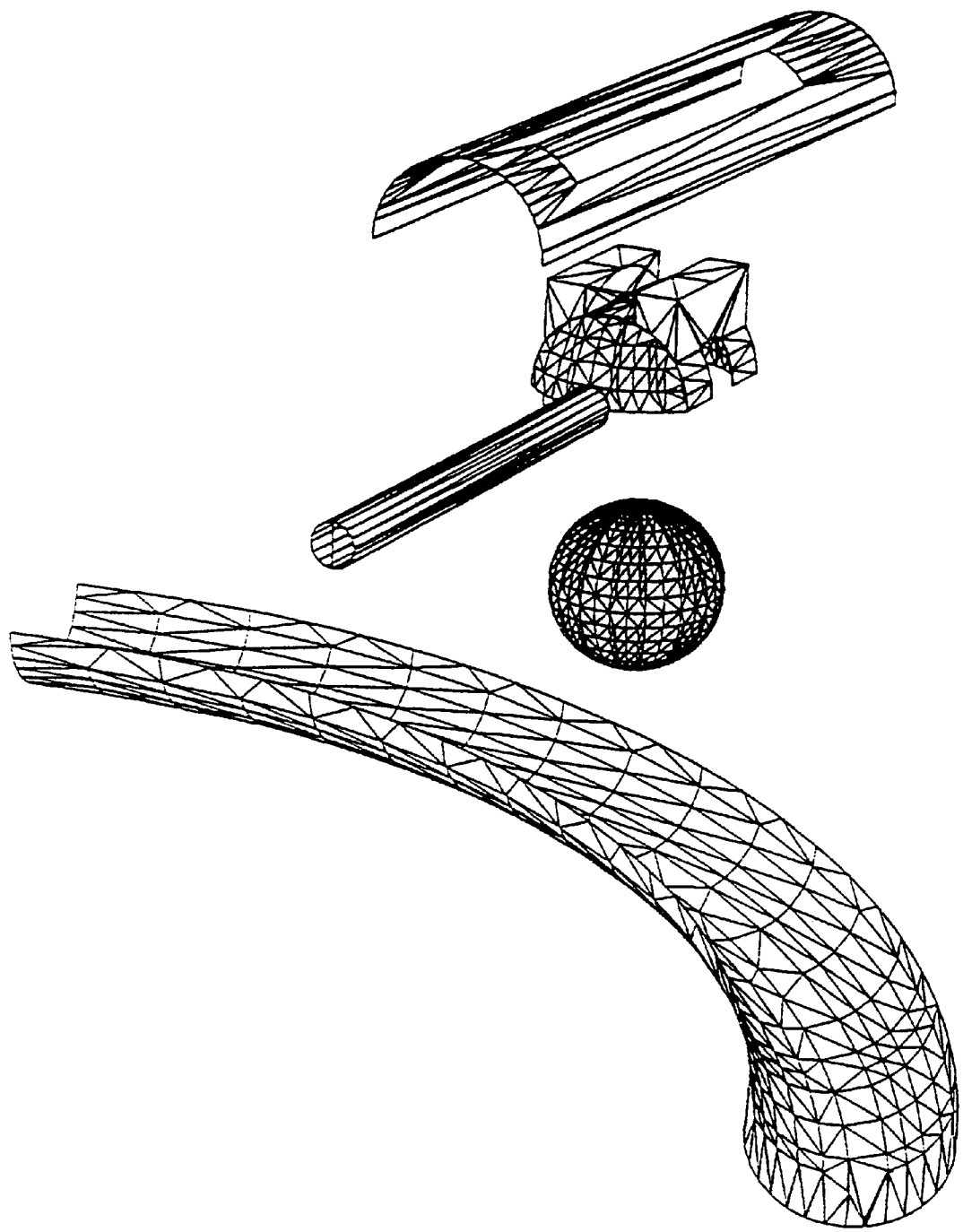

The tracks of the rotating and the stationary discs in which the balls are moving are adapted to a ballholder which is most suitable for the force distribution. This means that in the stationary disc the tracks 11, 24 have edges of the same height on both sides and the depth of the track is slightly less than the radius of the balls. The depth of the track may also vary as shown in FIGS. 10–13 from which it is obvious how the border lines or surfaces which delimit the linear and curved track respectively are closely adjacent to each other. As shown in FIG. 11 and FIG. 10, which is a cross-section along line X—X in FIG. 11, the section the linear track which is closes, to the centre of the device is made with extended edges 40 which extend themselves downwards past the centre plane of the ball. On the other hand, as shown in FIG. 12 and FIG. 13, which is a cross-section along line XIII—XIII in FIG. 12, the extent of the linear track that is further removed from the centre of the device has edges 42 which do not extend past the centre plane of the ball 15. The distance between the tracks is during at least parts of a working cycle only as great as is necessary to avoid direct contact between the limiting surfaces of the tracks taking into account the tolerances of various parts. The track 12 of the rotating disc has edges of different heights whereby the inner edge 28 i.e. the edge which is closest to the centre of rotation is somewhat lower than the outer edge 27. The inner 28 and the outer 27 edge is preferably on different sides of a plane through the centre of the balls and parallel to the plane of rotation. Like the ballholder the tracks are designed with consideration of the forces which occur at the application in question and also with consideration of the space which must be given to the ballholder.

Figure 4:
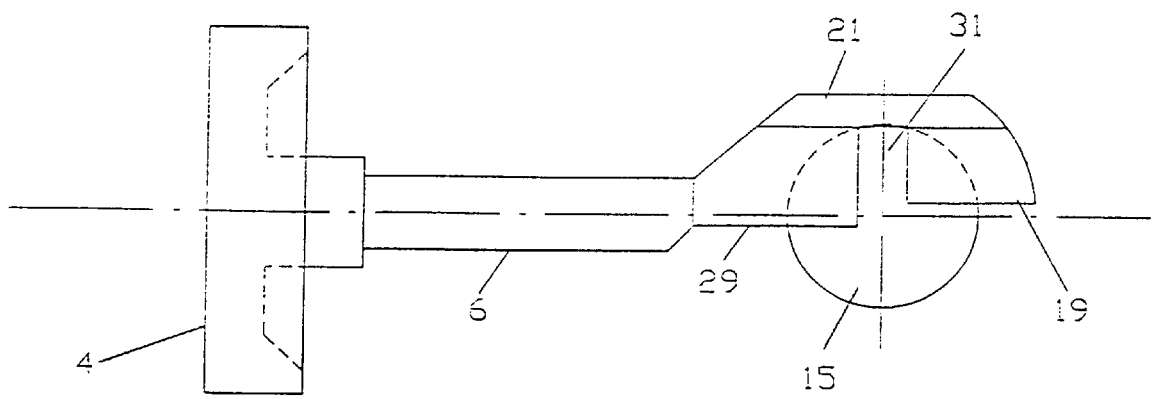
FIG. 4 shows an important detail of the device.
Figure 5:
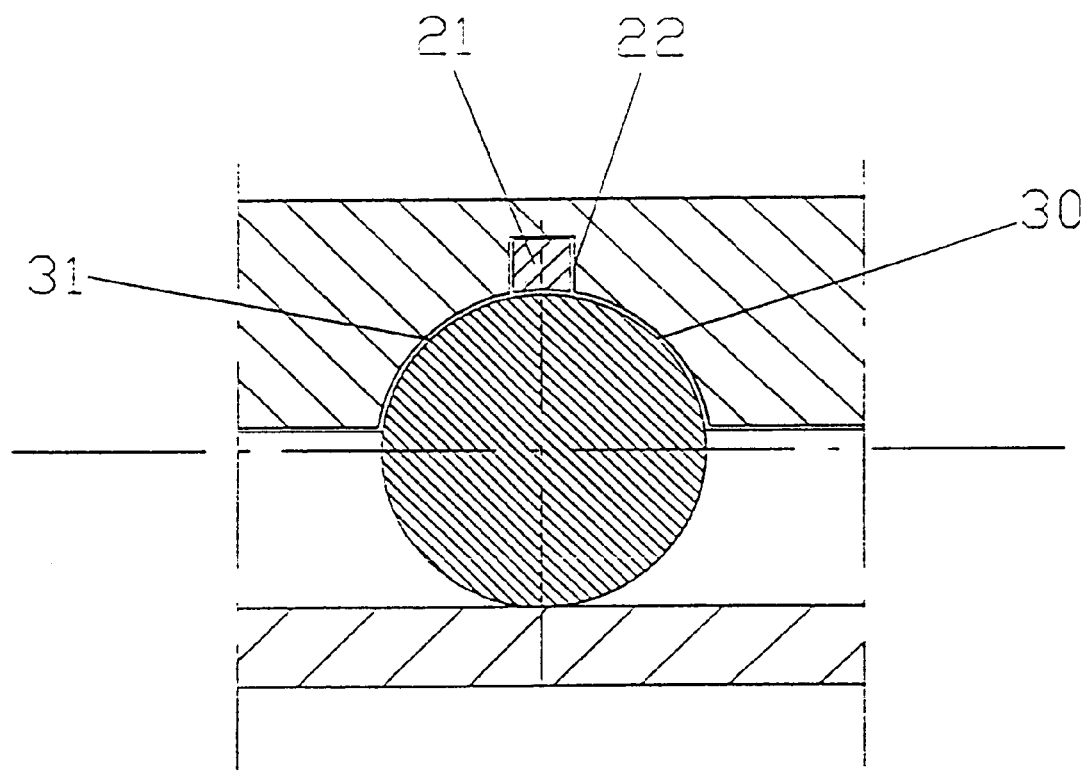
FIG. 5 shows a crossection of the detail of FIG. 4.
Figure 6:
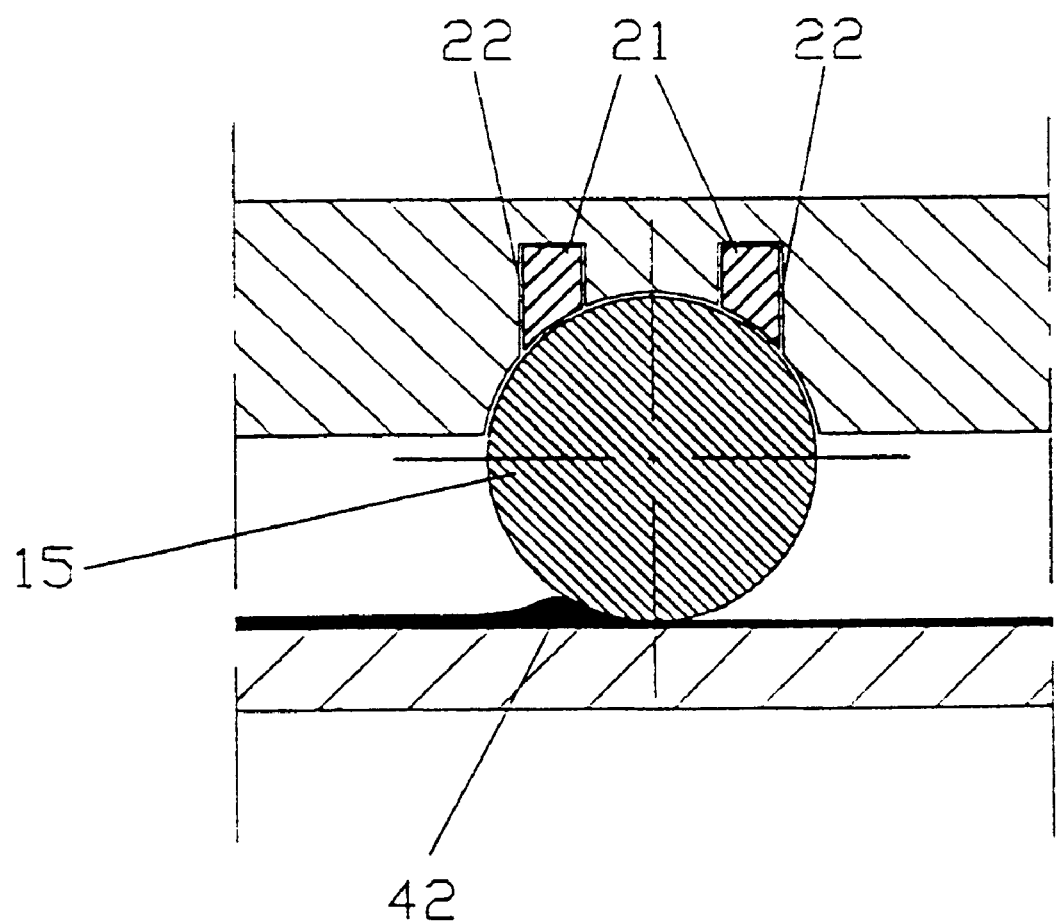
FIGS. 6, 7 and 8 show preferred embodiments of the detail of FIG. 5.
Figure 7:
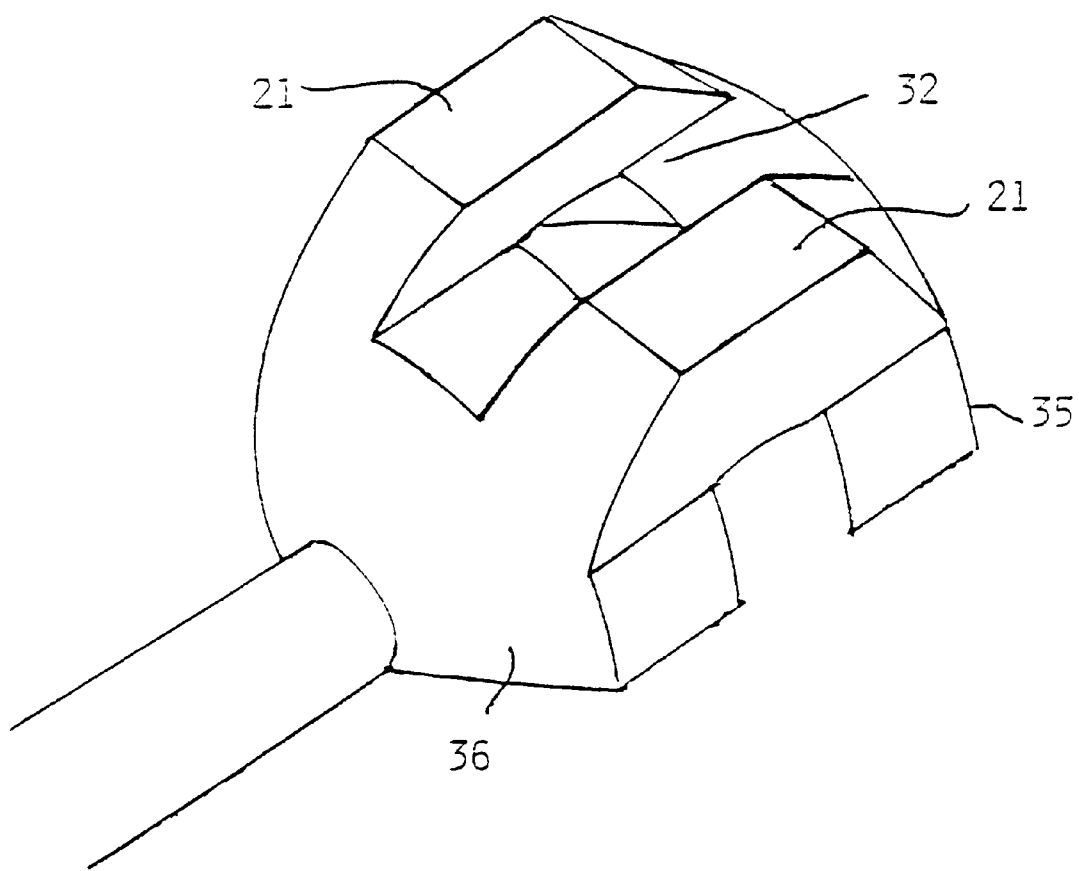
Figure 8:
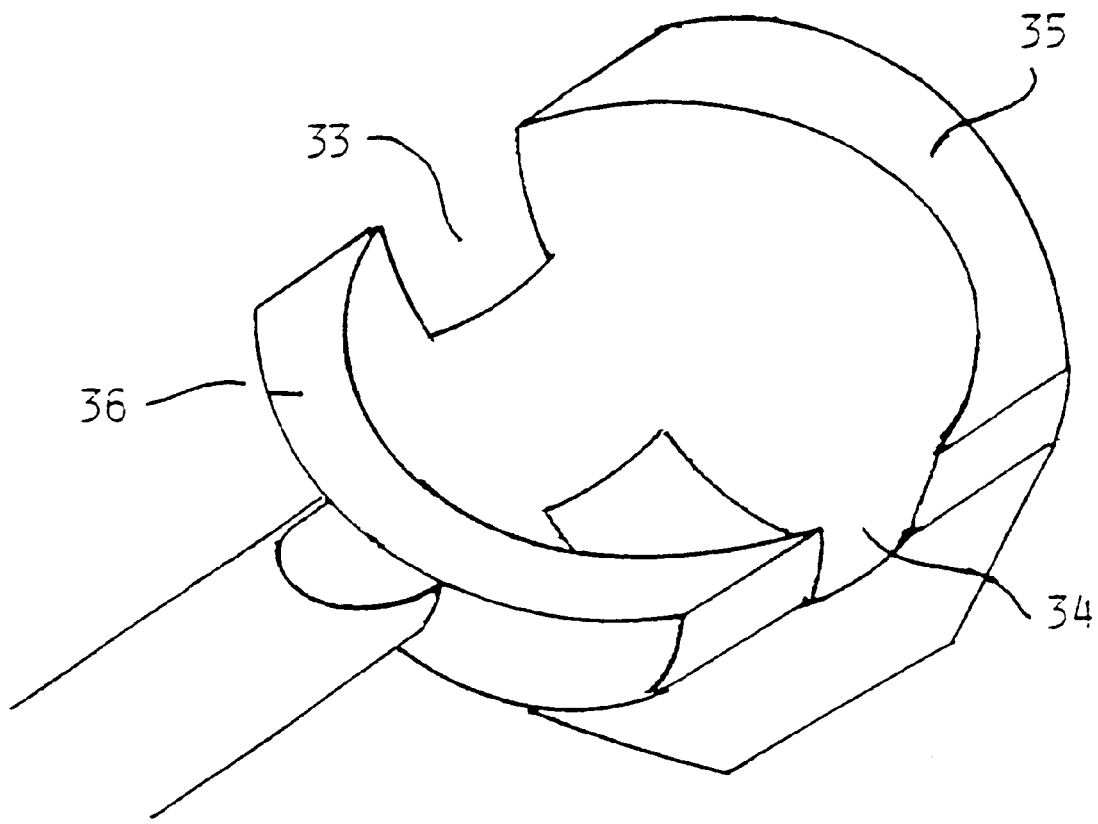

The upper part of the ball of FIG. 4 moves in the linear track in the stationary disc. The ball is then contacting the surface of the track as it extends through openings 30, 31 in the holder. The linear tracks 11, 24 are adjusted to closely adapt to the ball, the ballholder and the guide rail.

FIGS. 5, 6, 7 and 8 show various embodiments of ballholder and guide tracks. From FIG. 6 it is also apparent how the ball during movement (to the left in the figure) forces lubricant 42 in front of it. The lubricant is transferred by the ball to the holder and the walls of the stationary track which contact the ball. The ball co-operates with a front part 35 and a rear part 36 of the holder which parts are joined by guide rails 32. Between the parts of the holder there are side openings 33, 34 and a centre opening 21 through which the ball contacts the corresponding track of the stationary disc. The track which relative to the power source is fixed or stationary has above been described as being linear straight. In other embodiments also this track may be bent or shaped as a closed curve, e.g. an ellipse. These and other modifications are within the frame of the invented idea.

What is claimed is:

1. A device for transmission of force between a linearly moving mechanism and a rotationally moving mechanism comprising:

a fixed structure defining a fixed track;

a rotating structure defining a continuous, arcuate, rotating track, said rotating structure being constructed and arranged to be rotatable in a plane that is parallel to a plane containing said fixed track and to be coupled to a rotationally moving mechanism for rotary movement therewith, said rotating structure and said fixed structure being disposed in overlying relation with respect to each other with said fixed and rotating tracks opened toward each other;

a ball disposed in both said fixed track and said rotating track to permit movement of said ball along both said fixed track and said rotating track throughout rotation of said rotating structure; and a ball holding structure adapted to be coupled to a linearly moving mechanism for movement therewith and constructed and arranged to hold said ball throughout movement of said ball along said fixed and rotating tracks to thereby transmit force between the linearly moving mechanism and the rotationally moving mechanism, wherein mutually facing edges of said fixed and rotating tracks are in close proximity to one another such that no portion of said ball holding structure is disposed between said facing edges.

2. The device according to claim 1, wherein said ball holding structure is constructed and arranged to permit contact between said ball and said fixed and rotating tracks so that force transmission occurs only on sectors of great circles on an outer surface of said ball.

3. The device according to claim 1, wherein inner and outer edges of at least a portion of said rotating track are offset from a plane extending through the center of said ball and parallel to the plane of rotation of said rotating structure.

4. The device according to claim 3, where said inner and outer edges of said rotating track are situated on opposite sides of the plane extending through the center of said ball.

5. The device according to claim 1, wherein said rotating track is delimited by inner and outer edges of different heights relative to a bottom surface of said rotating track, whereby said outer edge is higher than said inner edge.

6. The device according to claim 1, wherein a depth of said fixed track is less than a radius of said ball along at least a portion of said fixed track.

7. The device according to claim 1, wherein said ball holding structure includes a guide rail that is movable in a guide track formed in said fixed track.

8. The device according to claim 1, wherein said fixed track is linear.

9. The device according to claim 1, wherein edges of said fixed track vary in their respective heights with respect to a bottom surface of said fixed track along the length of said fixed track.

10. The device according to claim 1, wherein an inner surface of each of said fixed track and said rotating track has a transverse curvature generally conforming to a curvature of an outer surface of said ball.

11. A motor comprising:
a cylinder block having a cylindrical bore formed therein;
a pair of pistons disposed within said cylindrical bore, each including a piston head and a piston rod, said pistons being arranged within said cylindrical bore such that said piston heads are in opposed, mutually facing positions within said cylindrical bore with said piston rods extending generally away from one another, said pistons being constructed and arranged for axial movement within said cylindrical bore in directions alternately toward and away from each other;
a fixed structure disposed adjacent each opposite end of said cylindrical bore and defining a fixed track extending away from each opposite end of said cylindrical bore;
a rotating structure defining a continuous, arcuate, rotating track surrounding said cylinder block, said rotating structure being constructed and arranged to be rotatable in a plane that is parallel to a plane containing said fixed tracks, said rotating structure and said fixed structure being disposed in overlying relation with respect to each other with said fixed tracks and said rotating track opened toward each other;
a pair of balls, each being disposed in both said fixed track and said rotating track to permit movement of each said ball along both said fixed track and said rotating track throughout rotation of said rotating structure; and
a pair of ball holding structures, each coupled to a one of said piston rods for movement therewith and constructed and arranged to hold a one of said balls throughout movement of said ball along said fixed and rotating tracks as said pistons move alternately toward and away from each other.

12. The motor of claim 11, wherein said fixed track is linear.

13. The motor of claim 12, wherein a center axis of said cylindrical bore is parallel to a line of movement of said ball within said fixed track.

14. The motor of claim 13, wherein the center axis of said cylindrical bore is coaxial with the line of movement of said ball within said fixed track.

15. The motor according to claim 11, wherein each of said ball holding, structures is constructed and arranged to permit contact between said one ball and said fixed and rotating tracks so that force transmission occurs only on sectors of great circles on an outer surface of said ball.

16. The motor according to claim 11, wherein inner and outer edges of at least a portion of said rotating track are offset from a plane extending through the centers of said balls and parallel to the plane of rotation of said rotating structure.

17. The motor according to claim 16, where said inner and outer edges of said rotating track are situated on opposite sides of the plane extending through the centers of said balls.

18. The motor according to claim 11, wherein said rotating track is delimited by inner and outer edges of different heights relative to a bottom surface of said rotating track, whereby said outer edge is higher than said inner edge.

19. The motor according to claim 11, wherein a depth of each of said fixed tracks is less than a radius of each of said balls along at least a portion of said fixed track.

20. The motor according to claim 11, wherein each said ball holding structure includes a guide rail that is movable in a guide track formed in each of said fixed tracks.

21. The motor according to claim 11, wherein edges of each said fixed track vary in their respective heights with respect to a bottom surface of said fixed track along the length of said fixed track.

22. The motor according to claim 11, wherein an inner surface of each of said fixed track and said rotating track has a transverse curvature generally conforming to a curvature of an outer surface of said ball.

23. The motor of claim 11, wherein mutually facing edges of said fixed tracks and said rotating track are in close proximity to one another such that no portion of either of said ball holding structures is disposed between said facing edges.

* * * * *